United States Patent [19]

Steffen

[11] Patent Number: 4,847,849
[45] Date of Patent: Jul. 11, 1989

[54] LASER INCLUDING AT LEAST ONE SEAL
[75] Inventor: Jürg Steffen, Sigriswil, Switzerland
[73] Assignee: Asulab S.A., Bienne, Switzerland
[21] Appl. No.: 26,316
[22] Filed: Mar. 16, 1987
[30] Foreign Application Priority Data
  Mar. 17, 1986 [FR] France .................. 86 03877
[51] Int. Cl.⁴ .............................. H01S 3/03
[52] U.S. Cl. ..................... 372/61; 372/62; 372/63
[58] Field of Search ............ 372/61–63, 372/103, 107, 109

[56] References Cited

U.S. PATENT DOCUMENTS

| | | | |
|---|---|---|---|
| 3,492,597 | 1/1970 | Neusel | 372/61 |
| 3,611,183 | 10/1971 | Fendley, Jr. | 331/94.5 |
| 3,705,999 | 12/1972 | Banse et al. | 313/197 |
| 4,153,317 | 5/1979 | Ljung et al. | 372/107 |
| 4,564,948 | 1/1986 | Golser | 372/61 |
| 4,575,853 | 3/1986 | Jako | 372/61 |
| 4,649,546 | 3/1987 | Schmid | 372/61 |
| 4,677,640 | 6/1987 | Petersen et al. | 372/103 |

FOREIGN PATENT DOCUMENTS 2086023 12/1971 France .
6028281 6/1985 Japan .

Primary Examiner—William L. Sikes
Assistant Examiner—B. R. R. Holloway
Attorney, Agent, or Firm—Griffin, Branigan, & Butler

[57] ABSTRACT

A laser includes a discharge tube formed from one piece and penetrating, with play, into an anode chamber on one side and into a cathode chamber on the other side, the anode and cathode chambers having a thermal expansion coefficient different from that of the discharge tube. Bellows are hermetically welded by their first ends to the anode and sealed by a glass bead to the discharge tube at their second ends.

8 Claims, 2 Drawing Sheets

LASER INCLUDING AT LEAST ONE SEAL

BACKGROUND OF THE INVENTION

It is known that a laser apparatus which must provide a certain power level is subjected to considerable heating. These arrangements generally comprise a discharge tube when concerning a gas laser or a bar when concerning a solid medium laser. In principle the tube or the bar is supported by two flanges maintained at a constant distance with the purpose of assuring good stability for the laser. However, in being heated the tube or the bar is displaced in said flanges and arrangements must be made in order that the relative movement may take place freely whilst assuring perfect sealing of the elements which are displaced with respect to one another.

A construction which enables the displacement as mentioned is described in U.S. Pat. No. 3,705,999. Here it concerns a gas laser equipped with a discharge tube 55 arranged to slide freely in a flange 50 fixed to an annular collar 52 as is shown by FIG. 2 of said document. A bellows 53 intended to compensate variations of length due to temperature variations of the tube 55 is arranged between the collar 52 and a collar 54, itself fixed to tube 55. The bellows is brazed by each of its ends to the collars which it couples, assuring thus perfect sealing towards the exterior of the gas contained in the tube. Since here the matter concerns collars having the same coefficient of thermal expansion, there is no difficulty in choosing a bellows having likewise the same coefficient and brazed on either side to the collars as mentioned.

The gas laser described in U.S. Pat. No. 3,611,183 includes a sealed quartz tube in which there are arranged a central anode and two cathodes at the ends. In a variant embodiment the tube is formed in two parts coupled by a bellows. Each end of the bellows is fastened to the corresponding tube by sealing in accordance with well-known techniques. Here the elements which are to be assembled i.e. the two half tubes exhibit like coefficients of thermal expansion, such giving rise to a type of weld which is the same for each end of the bellows. The purpose of the bellows in this particular citation is to obtain a precise alignment of the two half tubes, one following the other in a manner to obtain a perfect alignment of the axial optical path. The purpose of the present invention is completely different since the bellows as proposed provides a sealed assembly of two elements having different coefficients of thermal expansion in order to enable the displacement of such elements relative to one another following temperature differences which can arise.

The gas laser of Japanese patent document No. JP-A-60 28281 shows that the end mirrors are fastened to the discharge tube by means of bellows according to a known technique in order to maintain the distance between the mirrors constant when the temperature varies. Nothing however is known of the manner of sealing such bellows to the parts which they connect.

The Swiss patent document No. 474.880 describes an arrangement for pumping crystal lasers. There will be seen in the single figure of this document bar 1 which is supported by flanges 22 and 23 including structures 20. The sealing of bar 1 with respect to the cooling fluid filling space 15 is assured on each side by a toroidal seal 21.

Likewise there are known certain gas lasers using $CO_2$ the discharge tube of which, made of ceramic, is supported with play by the anode and cathode chambers, the seal being obtained by means of O-rings formed from polymers.

The last two cited examples show that it is customary to employ toroidal seals generally of plastic material when the elements employed do not provide the same coefficient of thermal expansion, as is the case when one is concerned with assembling a metallic element to a non-metallic element. However, experience shows that these seals lack reliability. Effectively, since they are subjected to severe stresses under normal use: important temperature variations, plasma bombardment, they age rapidly and must be replaced many times. They thus necessitate frequent maintenance shut-downs which bring about loss of time and high costs. It must likewise be mentioned that such seals are not absolutely impermeable and that for a gas laser employing them, it will be periodically necessary to re-establish at the interior of the cavity a pressure suitable to assure proper operation of the arrangement.

SUMMARY OF THE INVENTION

To overcome these difficulties, the laser of the present invention provides a seal which takes the form of a bellows hermetically welded by its first end to one of these elements and sealed by its second end to the other element by means of a glass bead.

BRIEF DESCRIPTION OF THE DRAWINGS

FIG. 1b is an enlarged detail of a part of the cross-section shown on FIG. 1a;

DESCRIPTION OF THE PREFERRED EMBODIMENT

Figure 1A:
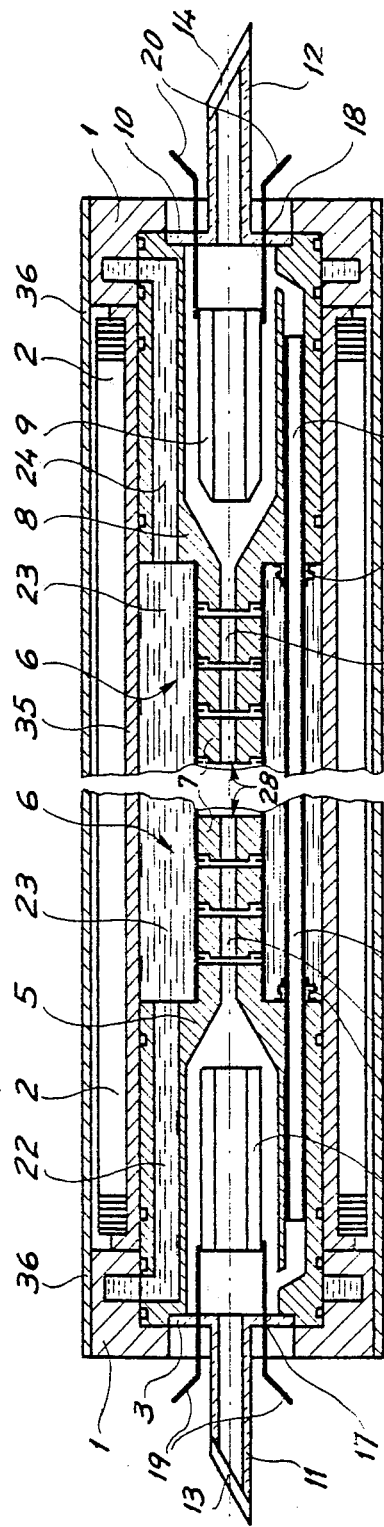
FIG. 1a is a longitudinal cross-section showing a gas laser according to a first embodiment of the invention, said laser being provided with recirculation ducts for the gas hermetically sealed at the place where they pass into the anode and cathode chambers.

FIG. 1a shows a gas laser provided with a discharge tube 6 formed from a multiplicity of metallic bodies aligned end to end, an anode chamber enclosing an anode 9 and a cathode chamber 5 enclosing a cathode 4. Each metallic body 7 is provided with a central opening 27 for forming the ionization chamber 28 when said metallic bodies are assembled. The laser includes further a cathode support 3 and an anode support 10, each fastened to a closing flange 1. An interior annular tube 35 entirely surrounds the discharge tube 6 and bounds a space 23 wherein circulates a cooling fluid. A winding 2 creates a magnetic field for confining the laser beam and is covered by a closing tube 36. Supports 3, 10 for the cathode and anode each bear furthermore pipes respectively referenced 11 and 12 at the ends of which are found Brewster windows 13 and 14 respectively. The enclosure thus defined is filled with a gas, for instance argon at low pressure (0.1 to 10 mbar). Passages respectively referenced 17 and 18 bear electrodes 19 and 20 which serve respectively for supporting and connecting the cathode 4 and the anode 9.

FIG. 1a shows finally that the laser is equipped with gas recirculation ducts of which a single one referenced 26 appears on the figure. These ducts have as purpose to avoid the formation of a pressure gradient which could be sufficient to annul the discharge, such gradient being brought about by the migration of positive ions and neutral atoms towards the anode.

According to the invention, duct 26 is hermetically sealed to the anode and cathode chambers 5 and 8 by means of bellows 30. In this particular case, the anode and cathode chambers 5 and 8 each form a first element and the duct 26 a second element and constitute an integral part of the laser construction. These first and second elements exhibit different coefficients of thermal expansion since they are formed respectively from an aluminum alloy and a ceramic.

Figure 1C:
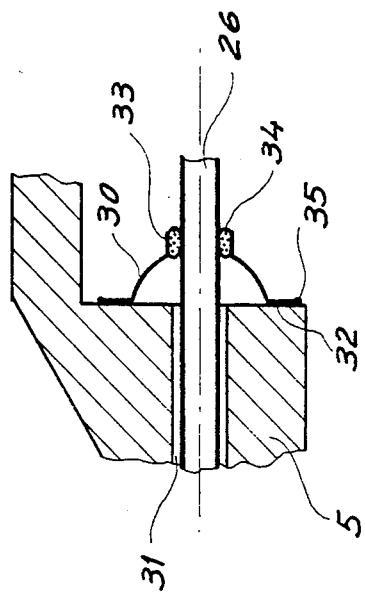
FIG. 1c is a variant of the embodiment shown on FIG. 1b.
Figure 1B:
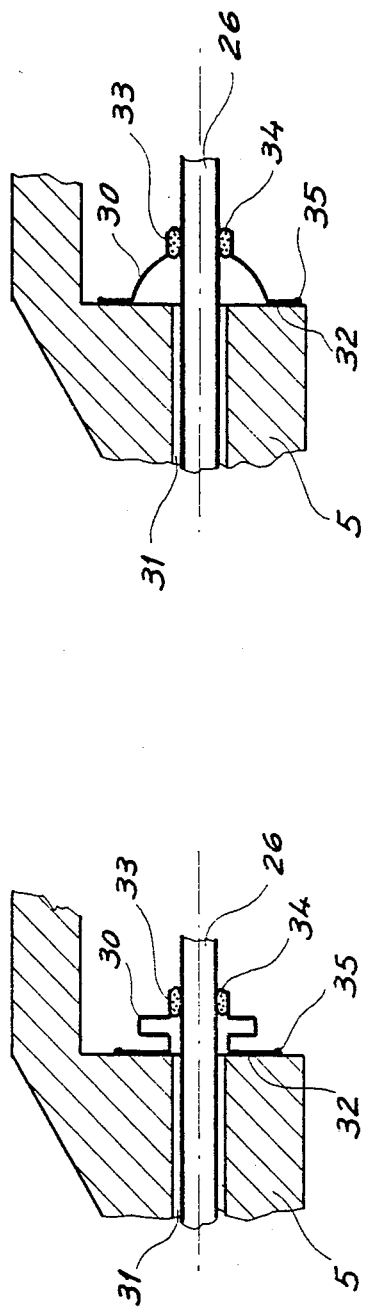

Thus, as shown by FIG. 1b which is a partial enlargement of the left side of FIG. 1a, the first and second elements 5, 26 are susceptible to be displaced relative to one another since clearance 31 has been provided between chamber 5 and the duct 26. During heating or cooling, such elements thus may slide in one another to the extent of their respective elongations. The same clearance likewise permits duct 26 and the orifice pierced in the chamber 5 to increase or diminish in diameter without causing jamming of the pieces in one another.

In the case where the discharge tube 6 is formed from aluminum, one may calculate that its elongation is 2.38 mm per meter of tube and an increase of temperature of 100° C. The ceramic duct 26 for the same length and the same temperature increase is elongated by 0.5 mm. The displacement of the tube relative to one of the chambers is thus (2.38−0.5): 2=0.9 mm.

Here it will be observed that the elements present ar not necessarily heated in the same manner. Effectively, on starting of the laser, there will be observed a high temperature gradient due to the fact that the central parts heat up more rapidly than the peripheral parts, this phenomenon accentuating further the relative displacement of said parts.

As shown on FIG. 1b, the bellows 30 is hermetically welded by its first end 32 to chamber 5 and is sealed by its second end 33 to duct 26 by means of a glass bead 34. The welding 35 of bellows 30 to chamber 5, here formed of an aluminum alloy, is preferably by brazing obtained by means of a cadmium-base product, for instance the brazing material referenced Nr. 1827 of the Castolin company. This could also be a continuous weld obtained by means of a laser beam. As far as the bead 34 is concerned, numerous types of glass are employed as welding agent which are referred to sometimes as "glass-frit" and which are provided in the form of a paste containing glass powder and a binder. For instance one may cite products marketed by the American company Corning and which are distinguished by a low melting temperature (on the order of 500° C.).

As to the bellows 30, it is formed from a material having substantially the same thermal expansion properties as that of the glass employed for the weld. One may employ nickel alloys containing approximately 29% nickel, 17% cobalt, the remainder being iron. These alloys exhibit a thermal expansion coefficient similar to that of the glass not only for a predetermined temperature, but over a range of temperatures extending generally up to the softening temperature of the glass. Such a material is provided for instance by the Stupakoff Ceramic company and is known by the registered trademark Kovar.

It is likewise important for good retention of the glass bead that the element to which the bellows is sealed has likewise a coefficient of thermal expansion as close as possible to that of the glass employed for the welding. In sum, materials will be sought (here duct 26, bead 34 and bellows 30) exhibiting substantially the same coefficient of thermal expansion, the second element of the construction (here the duct) determining the choice of glass bead and the bellows. This generally does not present a problem in view of the large number of varieties of Kovar and glass-frit. Thus, if reference is again made to FIG. 1a, bellows 30 assure perfect sealing for the passage of duct 26 into the anode and cathode chambers on the one hand, to the gas contained in the enclosure 28 and, on the other hand to the cooling liquid contained in space 23.

One may provide bellows 30 with every type of form and the invention is not limited to that which is shown on FIG. 1b. The form chosen will be that which is best adapted to the construction and to the expansions of the material employed. A variant is shown on FIG. 1c where the bellows 30 comprises a simple washer in the form of a dish.

Figure 2:
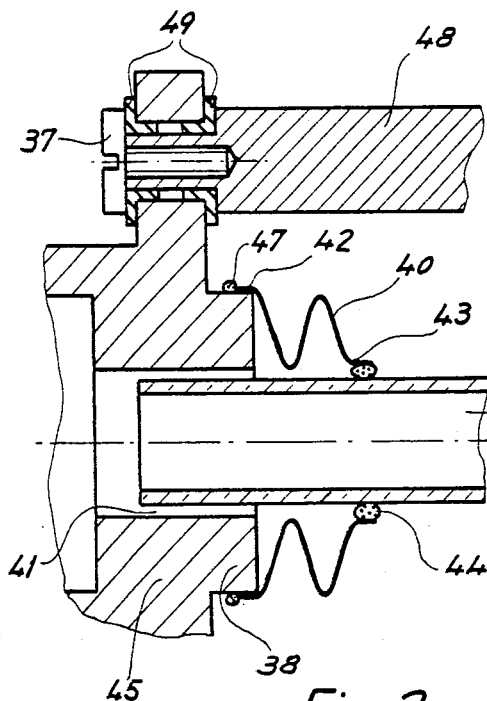
FIG. 2 is a cross-section showing a second embodiment of the invention applicable to a gas laser, the discharge tube of which is hermetically sealed to the anode and cathode chambers.

FIG. 2 is a partial cross-section showing a second embodiment of the invention applied to a gas laser employing $CO_2$. Here is shown an anode chamber 45 forming a first element of the laser and formed for instance of an aluminum or a nickel alloy. To this first element is assembled in a sealed manner a discharge tube 46 formed in a single piece and made for instance of ceramic. According to the invention, the sealed assembly employs a bellows 40 which is welded by its first end 42 to a collar 38 borne by the chamber 45 and which is sealed by its second end 43 to the tube 46 by means of a glass bead 44. The welding of the bellows to the collar 38 is referenced 47. This weld may be of brazing material of cadmium as has been mentioned with reference to the preceding embodiment. In the same manner, it will be arranged so that bellows 40, glass bead 44 and tube 46 are formed of materials having substantially the same coefficient of thermal expansion.

In the interests of simplification, FIG. 2 shows only the left part of the gas laser with its anode chamber. The right part with its cathode chamber is similar by reason of symmetry and has not been shown. The anode and cathode chambers are preferably maintained at a fixed distance by means situated outside the discharge tube. As shown on FIG. 2, these means comprise bars of which a single one 48 is shown on the drawing. These bars are formed of a material exhibiting negligible expansion if one intends to provide a laser having high stability. It will be understood in effect that under these conditions the distance between the mirrors which generally form part of the anode and cathode chambers, remain invariable whatever may be the heating of the laser arrangement. The material of these bars may be of Invar (registered trademark) the coefficient of thermal expansion of which is on the order of $1.5 \cdot 10^{-6}$ per degree centigrade. These bars 48 must be insulated from the anode and cathode chambers which are brought to different electrical potentials. Such insulation is shown here by the insulating pipe washers 49. Screw 37 fixes the bar 48 to chamber 45.

This type of laser is generally cooled by a cooling liquid surrounding the discharge tube 46. At this point, there is arranged between tube 45 and bars 48 a further tube (not shown) and formed for instance of ceramic. This tube is fixed by each of its ends to the anode and cathode chambers in the same manner as the discharge tube 46 which is to say by means of bellows.

Bars 48 could be replaced by a quartz tube entirely surrounding the arrangement. In this case one might improve the stability of the laser by a factor of 3 since the coefficient of thermal expansion of the quartz is on the order of $0.5 \cdot 10^{-6}$.

FIG. 2 also shows that tube 46 penetrates with clearance 41 into chamber 45 which permits said tube to slide freely into said chamber when the temperature changes. As an example, it will be indicated that with a tube 46 formed of ceramic (coefficient $5 \cdot 10^{-6}$), bars 48 formed of Invar, a tube length of one meter and a temperature increase of 100° C., the displacement of the tube relative to the chamber 45 is about 0.2 mm.

Figure 3:
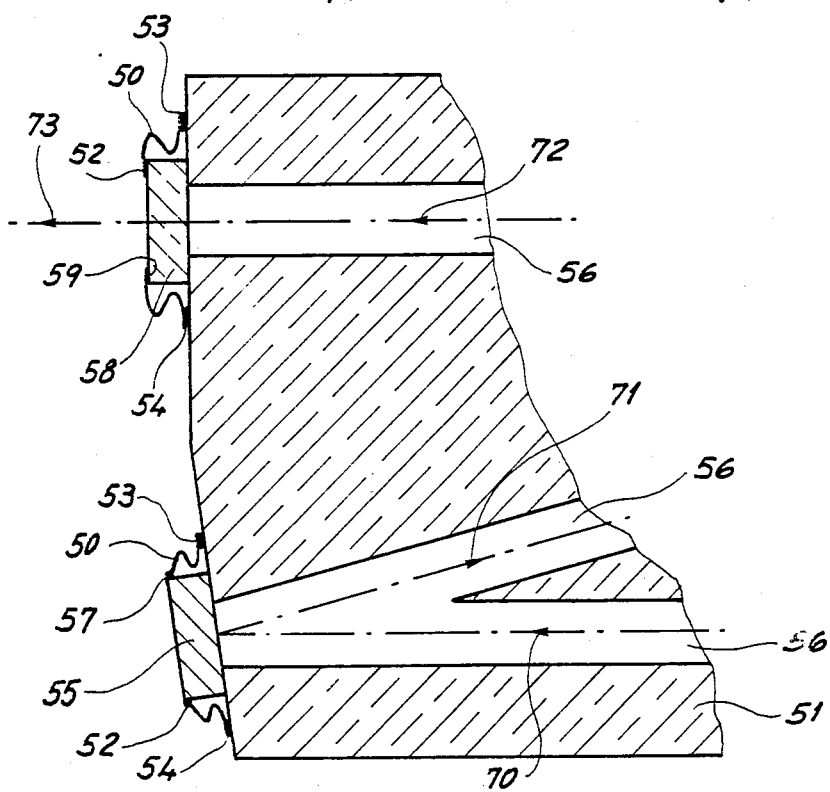
FIG. 3 is a cross-section showing a third embodiment of the invention applied to a gas laser of the folded type of which at least one mirror is sealed in a hermetic manner to the body of the laser.

FIG. 3 is a partial cross-section showing schematically a third embodiment of the invention applied to a gas laser of which the discharge tube is folded and which is arranged more particularly to provide a beam in the far infrared. Here there has been represented only the left part of the laser. It is formed mainly from a massive block of ceramic ($Al_2O_3$) 51 in which the discharge tube 56 is pierced in zig-zag. Coming over from a grid mirror (not shown) the beam 70 is reflected a first time by a metallic mirror 55 formed for instance of copper or molybdenum. The reflected beam 71 strikes again a metallic mirror (not shown) identical to that referenced 55 and is propagated in the discharge tube along path 72 to exit from the cavity at 73 by an output mirror 58. The output mirror is generally a crystal formed of zinc selenide (ZnSe).

In the construction which has just been described, we are again in the presence of two elements which must be assembled in a sealed manner and which provide different coefficients of thermal expansion. On the one hand, we have metallic mirrors 55 fixed against the ceramic block 51 and on the other hand, the output mirror 58 of crystal fixed against the same block. Since it is not practical to directly weld these mirrors onto the block, as such welding will not resist the temperature variations which occur, again there are employed the assembly means of the present invention.

To this end, the metallic mirrors 55 and the crystal mirror 58 are hermetically fixed to the ceramic block 51 by means of bellows 50 which by their first ends 52 are attached by welds respectively referenced 57 and 59 to said mirrors and by their second end 53 are sealed to said block 51 by a glass bead 54. Block 51, bead 54 and the bellows 50 are formed of materials exhibiting substantially the same coefficient of thermal expansion. The same products already mentioned and marketed by Corning and Stupakoff companies, for instance, may be employed for the glass bead 54 and the bellows 50 respectively.

As far as concerns welding 57 of the first end 52 of the bellows 50 onto metallic mirror 55, there will be employed a cadmium brazing material such as that already mentioned hereinabove. On the other hand, the welding 59 of the first end 52 of bellows 50 onto the crystalline mirror 58 is of another nature since here we are concerned with welding a crystal onto a metallic bellows formed of Kovar (registered trademark). One will commence by depositing on the edges of the mirror 58 a thin and weldable layer which could be the product Gelot (registered trademark) from the Balzers company. Finally, the end 52 of bellows 50 will be welded onto this thin layer by means of a low temperature brazing material.

This last described method shows that the invention is not limited to hermetic assembling of a metallic element onto a non-metallic element, but that it is more generally suited to the assembly of two elements providing different coefficients of thermal expansion, here the assembly of two non-metallic elements formed by the ceramic of block 51 and the crystal of mirror 58. FIG. 3 additionally shows that bellows 50 is applied by its first end 52 onto the outer face of mirror 58 and not onto its edge as is the case for mirror 55. This manner of assembly avoids imposing too much mechanical tension on the weld 59 or rather on the thin film which serves as a support to this weld, since it is necessary in order to assure permanent application of the mirror 58 onto block 51 to employ the elasticity of the bellows to force the mirror to be supported on the block. This elasticity is also employed for the metallic mirror 55. In this case however, the brazing material 57 is more resistant and it is thus not necessary to provide it on the outer face of the mirror.

Figure 4:
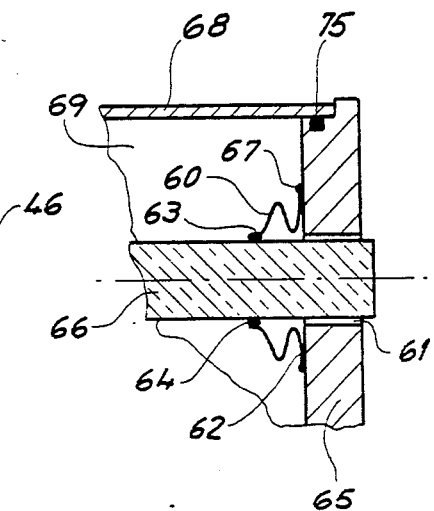
FIG. 4 is a cross-section showing a fourth embodiment of the invention applicable to a laser of the solid medium type, wherein the crystal is hermetically sealed to the flanges with which such laser is provided.

FIG. 4 is a partial cross-section showing a fourth embodiment of the invention applied to a laser using a solid medium. This medium according to the example shown comprises a bar 66 which may be a garnet of yttrium-aluminum (YAG) doped with neodymium ions. As is well known but not shown, there are, arranged in the axis of the bar 66, two mirrors having a common axis placed facing one another one of which being slightly transparent, provides passage to the output beam. A cavity 69, limited towards the exterior by a casing 68, surrounds the bar 66 as well as a discharge lamp (not shown). The cavity 69 contains a cooling liquid. The casing is fixed in a suitable manner to two flanges of which only that on the right 65 is shown. A seal 75 hermetically closes the cavity 69 onto flange 65. The figure shows that the bar 66 passes through flange 65 with clearance 61. It is the same for the other end of the bar by reason of symmetry.

According to the invention and as shown on the drawing, the flange 65 forming a first element of the laser is assembled in a sealed manner to the bar 66 forming a second element of said laser by means of a bellows 60 which is hermetically welded by its first end 62 to the flange 65 and is sealed by its second end 63 to said bar 66 by means of a glass bead 64. In view of this assembly, the cooling fluid contained in cavity 69 may not run out of said cavity. On the other hand, the bar and the flange may freely slide in one another following variations of the operating temperature. As has already been mentioned with respect to the embodiment of FIGS. 1a, 1b, 1c and 2, the weld of the first end 62 of the bellows 60 may be formed by a brazing material 67 to the flange 65 formed of aluminum alloy for instance. It is also arranged so that the glass bead 64 and the bellows 60 are formed of material exhibiting approximately the same coefficient of thermal expansion as that of the bar 66, which assures a perfect retention of the seal in all thermal situations which may occur.

There are thus obtained solid lasers of which the amplifying medium is a parallelepipedon in place of being elongated and circular. For this application also, the seal which is the object of the present invention is perfectly suited if in place of giving it a circular form, it is conformed to the cross-section of said medium. Thus this seal may be of a square or rectangular form.

This invention is not limited to the four embodiments which have just been described. It concerns generally all seals intended for the assembly of two elements providing different coefficients of thermal expansions, such elements being the principal parts of a laser apparatus. As first element, there has been mentioned the aluminum alloy but this could be another metal or further still, a non-metallic element such as a crystal (see third embodiment). The second element could be of glass, of quartz, of ceramic or of sapphire, provided that such second element may be sealed to a bellows by means of a glass bead.

What I claim is:

1. In a laser whose operating temperature may vary, the combination comprising: a first member, a second member, said first and second members having different thermal coefficients of expansion and liable to relative displacement with respect to each other in response to variations in said operating temperature; and a seal for impermeably connecting said first and second members, said seal comprising weld means and bellows means having first and second ends, said first end of said bellows means being hermetically sealed by said weld means to said first member and sealed by its second end to said second member by means of a glass bead, said bellows means, said second member and said glass bead being made of materials exhibiting substantially the same thermal coefficient of expansion.

2. The combination as claimed in claim 1 and further including brazle means for brazing said first end of said bellows means to said first member.

3. The combination as claimed in claim 1 wherein said laser is of the gas type, said first member is a mirror, and said second member is a base for supporting said mirror.

4. The combination as claimed in claim 1 wherein said first member is of metallic material and said second member is of non-metallic material.

5. In a laser of the gas type, the combination comprising:
a discharge tube comprising a plurality of metallic bodies aligned end to end, an anode chamber wall, a cathode chamber wall, a gas recirculation duct situated exterior of said discharge tube and extending with clearance through said anode chamber wall and said cathode chamber wall, said gas recirculation duct having a different thermal coefficient of expansion from that of said cathode chamber wall or said anode chamber wall; weld means; bellows means comprising first and second bellows each having first and second ends, said first ends of said first and second bellows being hermetically sealed by said weld means to said anode chamber wall and said cathode chamber wall, respectively, and sealed by their second ends to said gas recirculation duct by means of first and second glass beads, respectively, said bellows means, said anode chamber wall, said cathode chamber wall and said glass beads being made of materials exhibiting substantially the same thermal coefficient of expansion.

6. In a laser of the gas type, the combination comprising:
an anode chamber wall, a cathode chamber wall, a discharge tube comprising a single body extending with clearance through said anode chamber wall and said cathode chamber wall, said discharge tube having a different thermal coefficient of expansion from that of said cathode chamber wall or said anode chamber wall, means located exterior of said discharge tube for maintaining a fixed distance between said anode chamber wall and said cathode chamber wall, first and second bellows each having first and second ends, said first ends of said first and second bellows being hermetically sealed by said weld means to said anode chamber wall and said cathode chamber wall, respectively, and sealed by their second ends to said discharge tube by means of first and second glass beads, said anode chamber wall, said cathode chamber wall and said glass beads being made of materials exhibiting substantially the same thermal coefficient of expansion.

7. The combination as claimed in claim 4 wherein said laser is of the gas type, said first member is a mirror and said second member is a base supporting said mirror.

8. The combination as claimed in claim 4 wherein said laser is of the solid medium type and said first member comprises a first flange; a second flange, said second member comprising a bar supported with clearance between said first flange and said second flange, said bellows means comprising first and second bellows each having first and second ends, said first and second bellows being hermetically welded at their first ends to said first and said second flange, respectively, and sealed at their second ends to said bar by means of first and second glass beads, respectively.

* * * * *